(12) United States Patent
Reis et al.

(10) Patent No.: US 8,375,443 B1
(45) Date of Patent: Feb. 12, 2013

(54) CODE ANNOTATIONS FOR PREVENTING ACCESS TO UNSAFE FUNCTIONALITY

(75) Inventors: Charles Reis, Seattle, WA (US); Peter Hallam, Seattle, WA (US); Loren Kohnfelder, Bellevue, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/246,786

(22) Filed: Sep. 27, 2011

(51) Int. Cl.
*G06F 11/00* (2006.01)

(52) U.S. Cl. ..... 726/22; 707/103; 707/202; 707/E17.01; 717/5; 717/106; 717/125; 717/126; 726/25

(58) Field of Classification Search ............... 726/22, 726/25; 717/126, 140, 141, 148, 154; 709/204
See application file for complete search history.

(56) References Cited

U.S. PATENT DOCUMENTS

| | | | | |
|---|---|---|---|---|
| 6,128,774 A | * | 10/2000 | Necula et al. | 717/146 |
| 2007/0150509 A1 | * | 6/2007 | Lev et al. | 707/103 R |
| 2009/0077532 A1 | * | 3/2009 | Denney et al. | 717/106 |
| 2009/0157764 A1 | * | 6/2009 | Kundu et al. | 707/202 |
| 2009/0282477 A1 | * | 11/2009 | Chen et al. | 726/22 |
| 2011/0131561 A1 | * | 6/2011 | Adams et al. | 717/159 |

OTHER PUBLICATIONS

K. Bhargavan, C. Fournet, and A. D. Gordon. A semantics for Web services authentication. In 31St ACM Symposium on Principles of Programming Languages (POPL'04), pp. 198-209, 2004.*

B. Blanchet. From secrecy to authenticity in security protocols. In Proceedings of the 3rd International Static Analysis Symposium, vol. 2477 of Lecture Notes in Computer Science, pp. 342-359. Springer-Verlag, 2002.*

SMOCK: A scalable method of cryptographic key management for mission-critical wireless ad-hoc networks; He et al,IEEE transactions on Information Forensics and Security pp. (140-150) Publication Date: 2009 Publisher: Institute of Electrical and Electronics Engineers Inc.*

* cited by examiner

*Primary Examiner* — Thanhnga B Truong
*Assistant Examiner* — Jason Lee
(74) *Attorney, Agent, or Firm* — Sterne, Kessler, Goldstein & Fox P.L.L.C.

(57) ABSTRACT

A safe environment is established for running untrusted code in a system whose trusted libraries include native code. Annotations are applied to code in the system libraries to identify safe and unsafe code, and analysis tools reveal whether code outside the system libraries is able to trigger any unsafe behavior.

21 Claims, 5 Drawing Sheets

100 Computing Device

CODE ANNOTATIONS FOR PREVENTING ACCESS TO UNSAFE FUNCTIONALITY

BACKGROUND

1. Field

The field relates to security in a computing environment.

2. Related Art

A system for running code may offer safety properties, such as memory safety. The system may include a set of trusted libraries that untrusted third-party code may use. However, these libraries may include some code that could violate the safety properties of the system if called with the wrong parameters. An important goal of constructing a safe environment for running code is to prevent user code from violating the system's safety properties, despite the presence of unsafe code in the libraries.

A system may run code with safety properties ("managed code"), as well as code written in a different language without safety properties ("native code"). Managed code will not violate safety properties unless it calls native code with parameters that trigger unsafe behavior.

An important goal of a system that offers safety properties is to ensure that only safe methods are visible to user code. As a result, user code may run in the system without violating the safety properties of the system.

One example of how to approach the problem of constructing a system for running code that offers safety properties is JAVA technology. JAVA technology includes a language and a virtual machine (VM) that help run code that offers safety properties.

The JAVA language's access modifiers are typically used to prevent unsafe methods from being exposed to user code. JAVA technology includes the access modifiers "public", "protected", "package-private" (this label is the default, and is the label used unless another access modifier is used), and "private". The access modifier with which a method is associated determines the places in a set of JAVA code from where a method is visible and may be accessed.

JAVA technology is able to protect code to some extent by ensuring that native code that is unsafe is either marked private or package-private, thus restricting the code's visibility. This approach has several shortcomings. First, user code in the JAVA language may use reflection to bypass access modifiers and call unsafe methods. In reflection, a JAVA program may observe and modify its own operation at runtime, by using the library java.lang.reflect. Unless this capability is carefully regulated, reflection allows unsafe behavior.

Second, user code in the JAVA language may define its own native methods that violate the system's safety properties (i.e., are unsafe). Once again, unless this capability is controlled, this capability may allow unsafe behavior. The JAVA language provides a customizable SecurityManager that may help address unsafe behavior by native methods defined in user code. However, to manage the unsafe behavior, SecurityManager may also prevent the use of other desirable features. For example, use of SecurityManager may prevent unsafe behavior by blocking the defining of custom class loaders.

Another issue in the JAVA language as it presently operates is that there is no guiding documentation about which private or package-private methods are unsafe. While the private and package-private methods may be inaccessible, the lack of safety information for such methods may make it difficult for auditing tools to determine which methods pose a safety risk and which do not.

Also, as the JAVA language's system libraries are currently constructed, some methods in the JAVA language's system libraries have a public access modifier but are not safe to expose to user code. For example, the putObject method in the sun.misc.Unsafe class is a public instance method that may violate memory safety. This method is not actually visible to user code because an instance of the sun.misc.Unsafe class may only be constructed by system code, and system code never makes an instance available to user code. Thus, the public access modifier on the method may be misleading and does not accurately categorize methods as safe or unsafe.

The .NET Code Access Security faces similar issues with defining potentially unsafe methods for languages such as Visual C#. .NET and Visual C# favor runtime components that check whether code and callers of that code have permissions to perform particular actions. The runtime components represent an approach that helps manage potentially unsafe use of methods. For example, one runtime component is an assertion capability. However, such an assertion capability offers limited security and may not be able to handle many threats.

BRIEF SUMMARY

According to an embodiment, a computer-implemented method ensures that user code executes safely. Using a processor, a first set of system methods is determined in one or more system method libraries that are potentially unsafe using annotations associated with at least some of the system methods. Next the first set of system methods is divided into groups based on the annotations wherein the groups comprise always safe system methods and sometimes unsafe system methods. Finally, a code safety perimeter that controls visibility of system methods in the first set to user code is created. The code safety perimeter presents always safe system methods as always visible to user code, and the code safety perimeter presents sometimes unsafe system methods as non-visible to user code, and user code can only indirectly call sometimes unsafe system methods via always safe system methods that ensure the user code will behave safely.

According to another embodiment, a system ensures that user code executes safely. The system includes a processor that is configured to determine a first set of system methods in one or more system method libraries that are potentially unsafe using annotations associated with at least some of the system methods. The system further includes a system method dividing module that divides the first set of system methods into groups based on the annotations wherein the groups comprise always safe system methods and sometimes unsafe system methods. The system further includes a code safety perimeter module that creates a code safety perimeter that controls visibility of the system methods in the first set to user code. The code safety perimeter presents always safe system methods as always visible to user code, and the code safety perimeter presents sometimes unsafe system methods as non-visible to user code, and user code can only indirectly call sometimes unsafe system methods via always safe system methods that ensure the user code will behave safely.

According to another embodiment, a computer-readable medium has computer-executable instructions stored thereon that, when executed by a processor, cause the processor to ensure that user code executes safely by executing steps. The steps include those listed in the method embodiment, above.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the subject of the present application and, together with the description, further serve to explain the principles of the subject of the present application and to enable a person skilled in the pertinent art to make and use the subject of the present application.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
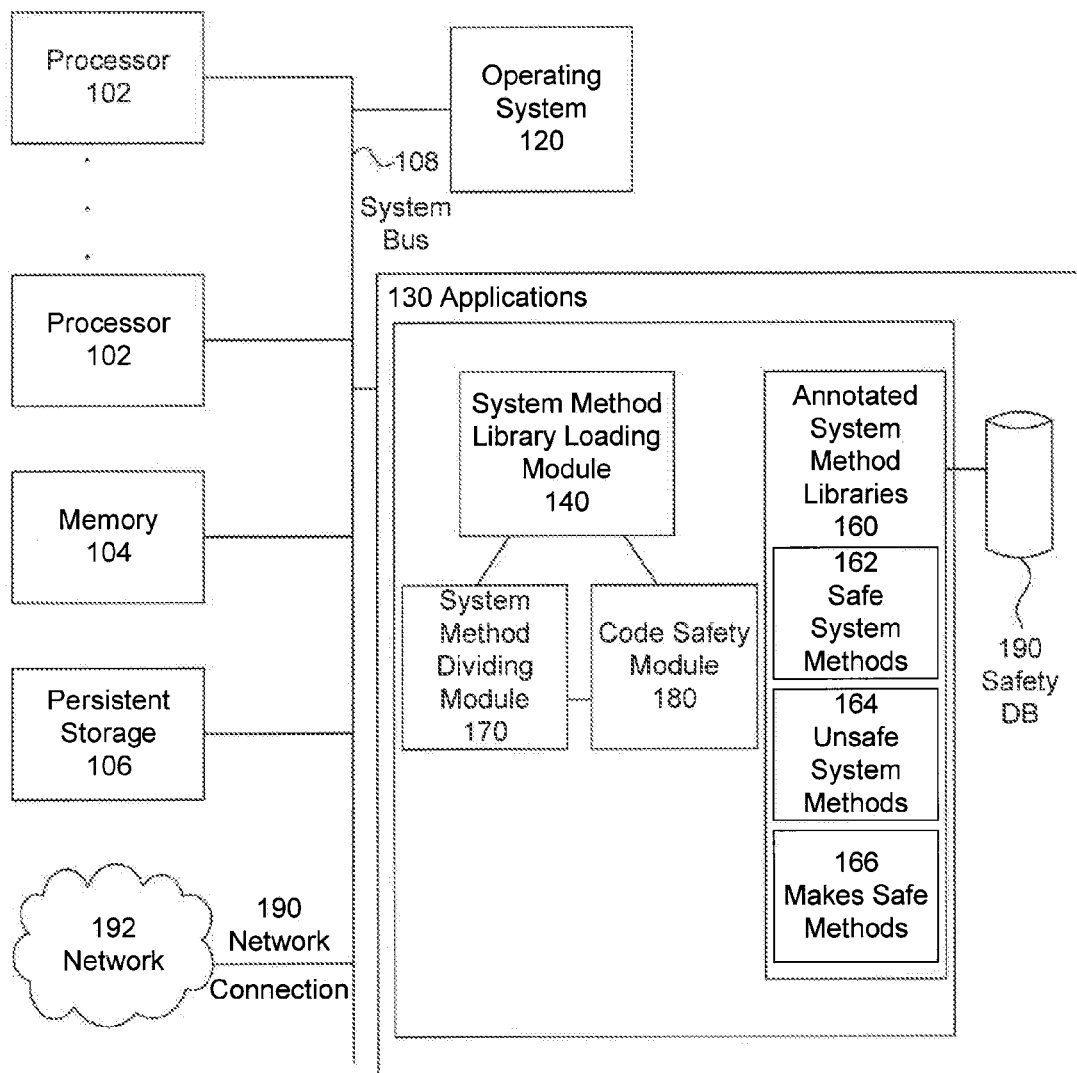
FIG. 1 is a diagram illustrating a system that establishes a safe environment for running untrusted code in a system whose trusted libraries include unsafe code, according to an embodiment.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Embodiments establish a safe environment for running untrusted code in a system whose trusted libraries include untrusted code.

Establishing code safety properties depends upon the distinction between trusted code provided with the system as part of the libraries ("system code") and untrusted code written by third-party developers ("user code"). Furthermore, each method in system code may either be visible to user code ("visible") or not directly exposed to user code ("non-visible"). Finally, methods that cannot violate the safety properties of the system regardless of the values of their parameters are considered to be "safe," and methods that could violate the safety properties for some parameter values are considered to be "unsafe."

In one embodiment, mechanisms and practices enforce rules for ensuring code safety. These rules govern the operation of the embodiments.

(1) User code may not be permitted to contain native methods. This rule may be enforced by removing the visible APIs in the system library for loading native code. Enforcing this rule ensures that user code may not directly violate the safety properties.

(2) User code may not be permitted to load classes into system namespaces. This rule is enforced by modifying the class-loading mechanism in the embodiments. The mechanism may only allow system code to load classes into the system namespaces. By enforcing this property, the embodiments ensure that user code cannot gain access to methods that are otherwise not visible to them.

(3) All native methods in the system code may be annotated as @Safe or @Unsafe. The precise syntax of this annotation may vary from embodiment to embodiment. For example, when applying an embodiment of the present invention to a the JAVA language environment, the JAVA source files for the system classes may include annotations such as:

Annotated Code Sample 1

@Safe
private native ClassLoader getClassLoader0( )
@Unsafe(Threat.CRASHPROCESS)
private native Field[ ] getneclaredFields0( )

Note that while the sample code throughout this application is provided for an embodiment which uses JAVA code, this embodiment is only illustrative. Embodiments are not limited to JAVA. Other embodiments may use JAVA, C#, other programming languages or various combinations of programming languages to ensure that user code executes safely.

Rule (3) may be enforced by using a code analysis tool that, in an embodiment, lists all native methods in system code and that may detect whether they are annotated or not. Implementing this rule may ensure that all native methods will be clearly identified for analysis.

(4) Managed methods may be annotated as either @Unsafe SFr @MakesSafe if they call an unsafe method.

(4a) A managed method, in an embodiment, may be annotated @Unsafe if it may be called in a way that causes an unsafe native method to violate the safety properties. Determining which annotation is appropriate is determined via manual code inspection by humans.

(4b) A managed method, in an embodiment, may be annotated @MakesSafe if it ensures that all unsafe methods it calls may never violate the safety properties. Such an annotation may be added by the developer and verified via manual code inspection by humans. In both cases, the presence of the annotations may be enforced by a code analysis tool that, in an embodiment, must list all callers of any method annotated as @Unsafe. This practice may ensure that auditors may easily find any methods in the system libraries that pose a risk of violating the safety properties.

(5) Methods annotated as @Unsafe, in an embodiment, may not be visible to user code. Visibility is partly determined using access modifiers, such as the JAVA language's public or private modifiers. Methods may also be non-visible if they are public but they are enclosed in an annotation of @Inaccessible. Manual code inspection may be used to ensure that references to an @Inaccessible type are not leaked to user code.

For example, the JAVA language's sun.misc.Unsafe class may be annotated as @Inaccessible because instances of it may only be created by a factory method that throws a SecurityException if it is called by user code. It is also important to note that no references to sun.misc.Unsafe are given out to user code. (Otherwise system code could create it, give out a reference to user code, and then user code could violate the safety properties.) Such classes may be identified by appropriate analyses of factory methods as they relate to questionable classes.

The above rules may be enforced by a code analysis tool that, in an embodiment, lists all methods that are visible to user code and that checks whether they have an @Unsafe annotation. This rule may ensure that user code cannot cause a native method to violate the safety properties, even indirectly. Combined, these rules may prevent user code from violating the safety properties of the system. Such a code analysis tool may analyze the code to ensure safety properties and then digitally sign the code as assurance that this was done.

Alternative embodiments of the invention might use a separate database of safe and unsafe methods, rather than applying annotations directly to the source code. Another alternative to annotations would be naming conventions for packages or types (e.g. "unsafe_[name of package]", etc.)

While the embodiments are presented here in the context of the JAVA language, the embodiments may be useful for any implementations of managed language VMs that wish to preserve safety properties for untrusted user code.

Certain exemplary embodiments may operate in conjunction with a secure architecture. Such a secure architecture offers additional security safeguards that provide additional protection to annotated code. While bytecode running in a JAVA VM is generally memory safe, there are still many ways in the VM to violate memory integrity. These violations may not be allowed, because they would represent a security threat.

As a result, the secure architecture enforces several security restrictions on its JAVA VM and libraries to protect memory integrity, as discussed above.

Each of the constituent parts of embodiments may be implemented on any computing device. Such a computing device may include, but is not limited to, a personal computer, a mobile device such as a mobile phone, a workstation, an embedded system, a game console, a television, a set-top box, or any other computing device. Further, a computing device may include, but is not limited to, a device having a processor and memory for executing and storing instructions. Software may include one or more applications and an operating system. Hardware may include, but is not limited to, a processor, memory and graphical user interface display. The computing device may also have multiple processors and multiple shared or separate memory components. For example, the computing device may be a clustered computing environment or server farm.

Each of the constituent parts of embodiments may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database. The specific organization of an exemplary computing device is discussed in greater detail, below, in conjunction with FIG. 1.

It should be noted that computer-readable medium embodiments may consist of any physical medium which is capable of encoding instructions that may subsequently be used by a processor to implement the present method. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that may serve in the role of providing instructions to a processor may be used to store the instructions in these embodiments.

Safe System Environment

FIG. 1 is a diagram illustrating a system that may establish a safe environment for running untrusted code in a system whose trusted libraries include unsafe code. The diagram of FIG. 1 illustrates a computing device 100 that contains a combination of hardware, software, and firmware constituent parts that allow it to run an Applications 130 layer with access to a network 192. Computing device 100 in the embodiment may be organized around a system bus 108, but any type of infrastructure that may allow the hardware infrastructure elements of computing device 100 to communicate with and interact with each other may be used to function as this part of computing device 100.

The processing task in the embodiment of FIG. 1 is carried out by one or more processors 102, but it should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors 102 for certain processing tasks.

In order to manipulate data to act as an embodiment, the processors 102 access a memory 104 via system bus 108. For data which needs to be stored more permanently, the processor accesses persistent storage 106. Processors 102, memory 104 and persistent storage 106 operate in coordination with operating system 120 to provide basic functionality for computing device 100. Operating system 120 provides support functionality for a layer of applications 130.

Computing device 100 may optionally use network connection 190 to communicate with other processing machines via network 192. Network connection 190 may be a wired connection such as Ethernet, token ring, optical, DSL, cable, or phone connection in conjunction with an appropriate modem. Similarly, appropriate wireless technology may be used to act as network connection 190 to access a network 192. Network 192 may be the Internet, a local area network, or any other network 192 of machines with which computing device 100 may exchange data.

As another piece, computer system 100 includes several modules in its applications 130 layer. One of the modules is a system method library loading module 140. The system method library loading module 140 loads information about system methods from annotated system method libraries 160, which in an embodiment may store safety information about the system methods in a safety database (DB) 190. The annotated system method libraries 160 additionally include information about the system methods, categorized as safe system methods 162, unsafe system methods 164, and information about makes safe methods 166, which are methods that can only call the unsafe system methods 162 in ways that will cause them to behave safely.

Figure 2:
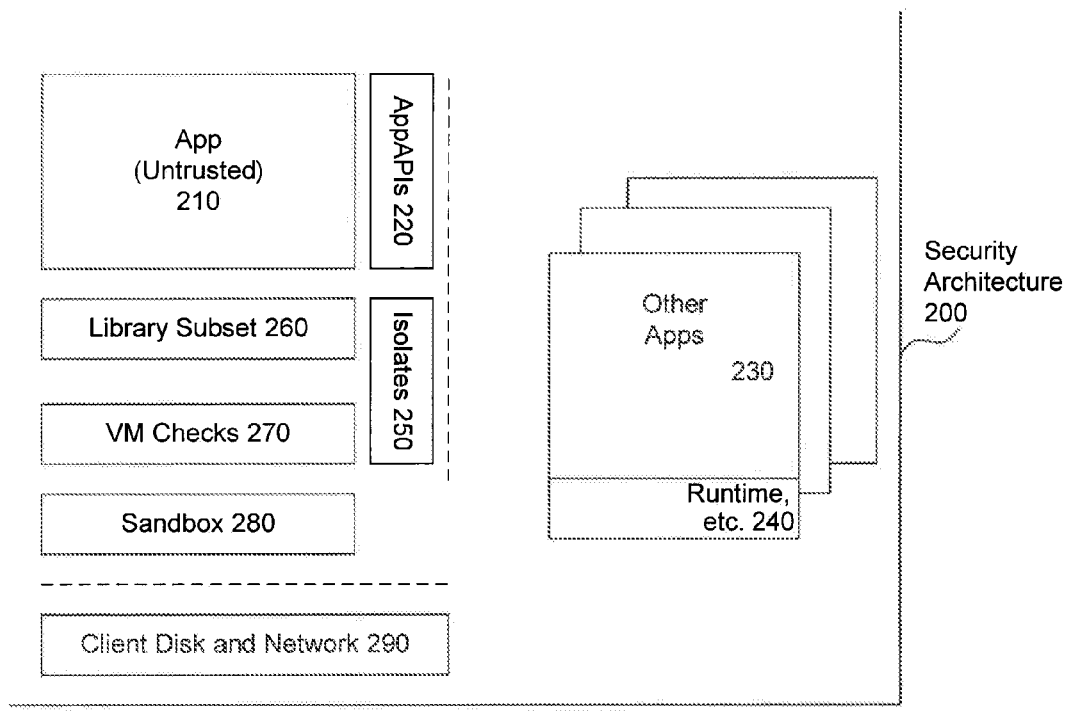
FIG. 2 is a security architecture of elements of a system for running untrusted code in a system whose trusted libraries include unsafe code, according to an embodiment.

FIG. 2 is a security architecture of elements of a system for running untrusted code in a system whose trusted libraries include unsafe code. The security architecture 200 includes an App (Untrusted) 210 which may have been written by an adversary. The access of the App 210 to the system on which it runs is regulated by software barriers through App APIs 220, Isolates 250, a Library Subset 260, VM Checks 270, and a Sandbox 280. In one example, Library Subset 260 and VM Checks 270 may be implemented in JAVA as JAVA Library Subset 260 and JAVA VM Checks 270. These software barriers protect the client disk and network 290 from being accessed by the App 210 without security checks.

In the background, other apps 230 may also run concurrently on a runtime environment 240, such as, JAVA Runtime—and related software.

To protect the client from attacks, security architecture 200 prevents code from accessing local resources such as the disk and the network. Thus, it only provides a subset of the libraries 260 that excludes any APIs with disk or network access. Instead, developers may use security architecture 200's bindings to infrastructure for persistent storage and network communication. Security architecture 200 also takes advantage of a sandbox 280 for a second line of defense. Security architecture 200's environment rans entirely within security architecture 200's sandboxed processes, limiting the damage that a program may cause.

In addition, security architecture 200 may maintain the integrity of the libraries 260. If malicious code could violate memory safety in the libraries 260, it could bypass security mechanisms in the app process. Security architecture 200 handles this risk by restricting certain language features that could put memory safety at risk. Thus, native methods are disallowed. Serialization support is removed, to avoid deserializing corrupted objects. Custom classloaders are allowed, but they cannot load classes into system packages. Reflection is allowed, but it cannot bypass access restrictions on system classes. Similarly, implementation classes that pose risks cannot be directly accessed by user code. These hard-coded policies protect the app process while still exposing powerful features like reflection.

Figure 3:
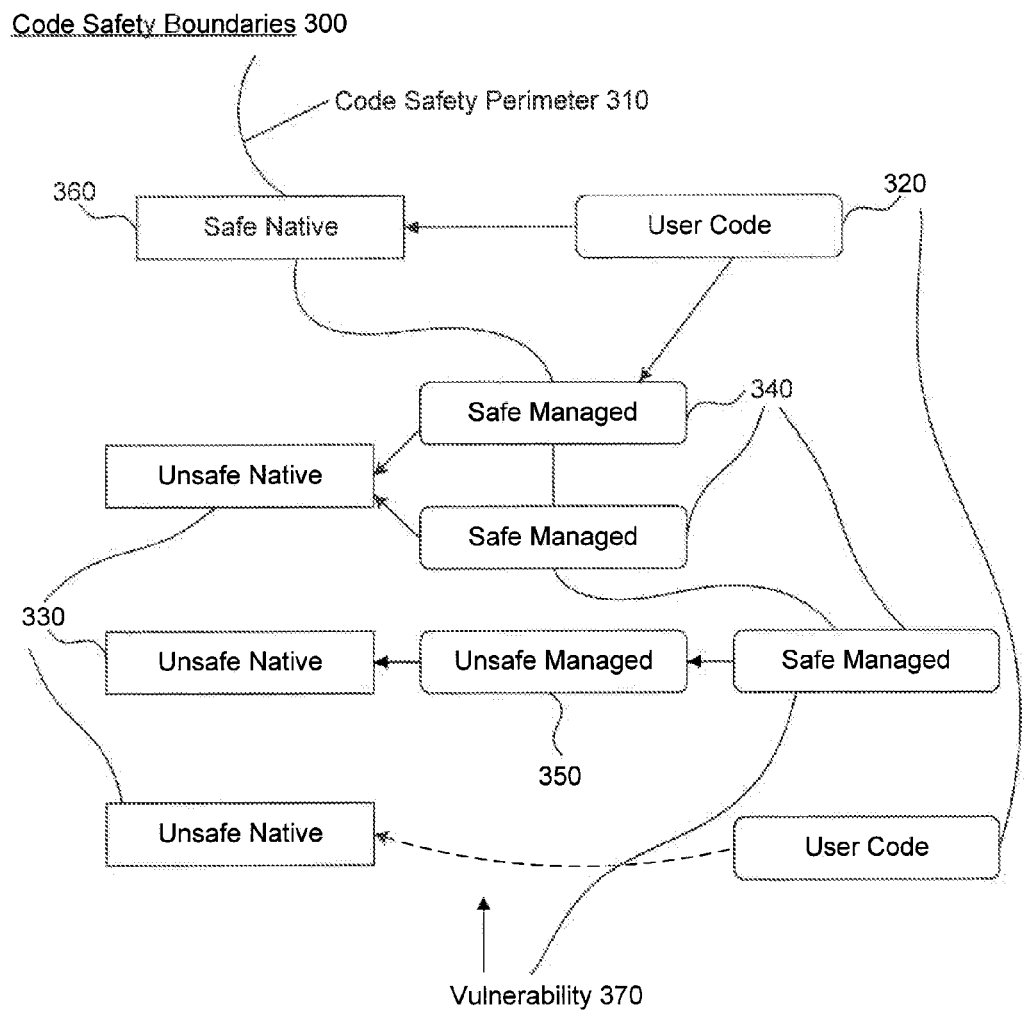
FIG. 3 is a diagram of code safety boundaries in a system whose trusted libraries include unsafe code, according to an embodiment.

FIG. 3 is a diagram of code safety boundaries in a system whose trusted libraries include unsafe code. As discussed above, the code (such as, JAVA code) may be divided into managed and native code as well as system and user code. It is possible to establish a code safety perimeter 310, based on how safe and unsafe code interrelate in a software environment. In order for code to be safe, it must either reference a layer of safe native 360 code or safe managed 340 code. Thus, user code 320 that accesses safe system native code 360, user code 320 that accesses safe managed 340 that accesses unsafe system native code 330, or safe managed code 340 that accesses unsafe managed code 350 that accesses unsafe native code 330 are all safe. However, user code 320 that accesses unsafe native code 330 presents a vulnerability 370 because there is no managed code safeguarding access to the unsafe native code 330. There may be provisions for safety either at the level of managed code or else the native code may be inherently safe.

Code safety perimeter 310 defines a boundary between safe and unsafe methods. Code safety perimeter 310 may include rules or definitions that establish a layer of methods at which safety is guaranteed. The goal of establishing code safety perimeter 310 is to identify which system methods can have guaranteed safety, and which system methods may present a safety risk. For system methods that have guaranteed safety, code safety perimeter 310 can present such methods as being always visible to user code. For system methods that may sometimes be unsafe, code safety perimeter 310 may make them non-visible to user code, and only allow them to be called indirectly in a way that ensures that such system methods will behave safely. The advantage of establishing a code safety perimeter 310 is that at some point when accessing code, the accessing must at some point access code whose safety has been verified in order to ensure that there will not be a safety risk. Based on code safety perimeter 310, it is possible to control the visibility of various methods to ensure that only safe code is visible. For example, code safety perimeter 310 can ensure that user code 320 either accesses safe native code 360 or safe managed code 340 at some point before accessing unsafe native code 330 or unsafe managed code 350. Code safety perimeter 310, as illustrated in FIG. 3, provides that as long as some type of safe code has been accessed before passing through code safety perimeter 310, there will not be a safety problem. Thus, if safe code has been accessed, code safety perimeter 310 can facilitate access to the code. However, if user code 320 directly accesses unsafe native code 330, as discussed it may present a vulnerability 370. Hence, code safety perimeter 310 can recognize that there may be vulnerability 370 and restrict access and visibility to the unsafe native code 330.

For example, one implementation of code safety perimeter 310 may be an audit perimeter. An audit perimeter, as discussed below, is a code safety perimeter that is defined by annotations that specify safety properties of system methods. The annotations, by specifying safety properties of system methods, help to establish how to perform an audit of code so that potential safety threats can be identified. Thus, the annotations establish an audit perimeter that is a type of code safety perimeter, such that the audit perimeter establishes a boundary at which code safety is guaranteed. For example, the audit perimeter may establish that certain methods are always safe, or are safe when called in a certain way. By establishing this boundary, the audit perimeter defines a code safety perimeter that can be used to restrict visibility of code when its safety is questionable.

Figure 5:
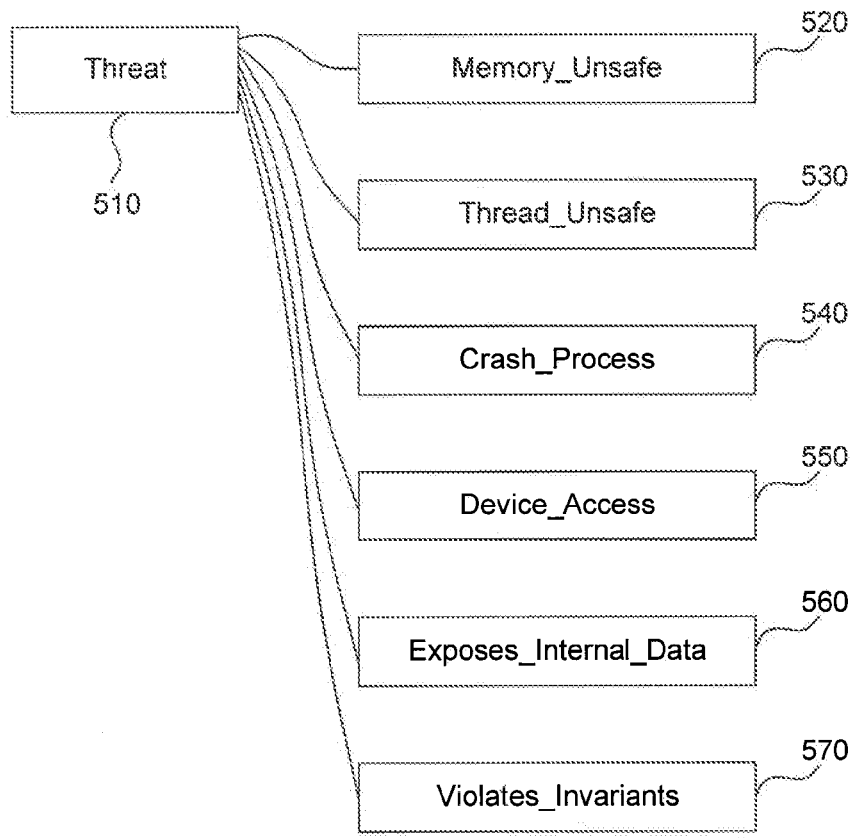
FIG. 5 is a diagram of various safety threats that unsafe code may present in a system whose trusted libraries include unsafe code, according to an embodiment.

FIG. 5 is a non-exhaustive diagram of various safety threats that unsafe code may present in a system whose trusted libraries include unsafe code. A threat 510 may be of several types. One threat is memory_unsafe 520, where a method may access memory that it is not supposed to. Another threat is thread_unsafe 530, where a method may cause concurrency bugs such as race conditions. Another threat is crash_process 540, where a method may cause a process to crash. Another threat is device_access 550, where a method may access a hardware device that it should not have access to. Another threat is exposes_internal_data 560, that occurs when a method accesses data that should remain hidden from user code. Another threat is violates_invariants 570, which occurs when a method is subject to invariants and it does not maintain the invariants when called. While these are presented as potential threats to be used in embodiments, it should be noted that other appropriate types of threats that jeopardize the security, stability, or reliability of a system may also be addressed by embodiments.

When the code is being audited, it is important to inspect all unsafe methods. The unsafe methods need to be parameterized by all of the Threats they pose (either in their own code or in code that they call) and they may be considered safe against all other Threats. It is also important to be careful to analyze unsafe methods that might call into user code, such as by using a callback function. Some likely risks involve native thunking code. All MakesSafe methods also need to be inspected so that they have effective checks to prevent the unsafe methods they call from being called in unsafe ways. It is also important to record when classes or methods are audited, so that it is possible to track when they need to be re-audited after code changes. For example, safety DB 190 may maintain records of audited filenames and audit timestamps, and it is possible for embodiments to periodically flag any files with newer timestamps for an audit.

Figure 4:
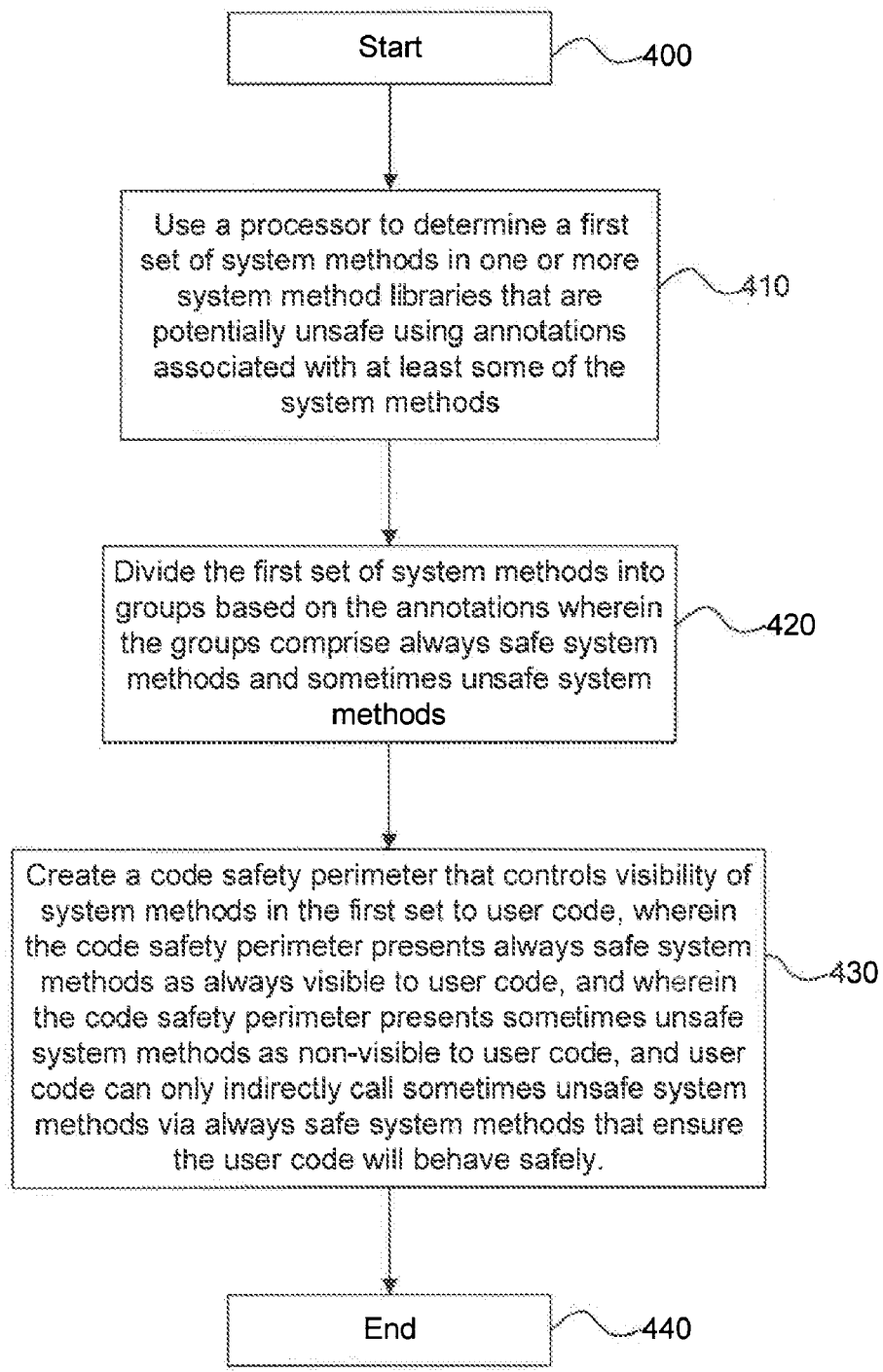
FIG. 4 is a flowchart of a method that preserves code safety in a system whose trusted libraries include unsafe code, according to an embodiment.

FIG. 4 is a flowchart of a method that preserves code safety in a system whose trusted libraries include unsafe code. The method begins at stage 400.

Stage 410 uses a processor to determine a first set of system methods in one or more system method libraries that are potentially unsafe using annotations associated with at least some of the system methods. For example, stage 410 may be carried out by processors 102 in conjunction with the system method library loading module 140, the annotated system method libraries, and the safety database 190. Stage 420 divides the first set of system methods into groups based on the annotations wherein the groups comprise always safe system methods and sometimes unsafe system methods. For example, stage 420 may be carried out by the system method dividing module. Stage 430 creates a code safety perimeter that controls visibility of system methods in the first set to user code, wherein the code safety perimeter presents always safe system methods as always visible to user code, and wherein the code safety perimeter presents sometimes unsafe system methods as non-visible to user code, and user code can only indirectly call sometimes unsafe system methods via always safe system methods that ensure the user code will behave safely. For example, stage 430 may be carried out by code safety perimeter module 180 in conjunction with the annotated system method libraries 160. The method ends at stage 440.

Design of Security Annotations

Safe Methods and Unsafe Methods

The security annotations in embodiments' system class libraries designate which methods are safe to expose to user code and which are not. They include the following annotations, which in an exemplary embodiment may be contained in a specialized package.

@Safe: Any native method that cannot violate safety properties, regardless of its arguments @Unsafe: Any native method that could violate safety properties if called with certain arguments @MakesSafe: Any method that establishes all preconditions needed for calling an @Unsafe method safely @ThreatDocumentation: Optional, for providing comments about the use of security annotations The @Unsafe and @MakesSafe annotations are parameterized by particular threats that a method may pose, as discussed above in connection with FIG. 5. Any method annotated as @MakesSafe may list all the threats posed by the unsafe methods that it calls, as described in the rules below.

The @Unsafe and @MakesSafe annotations may also be applied at the class level, where they refer to all static initializers and static blocks in the class (since the JAVA language does not allow annotating such blocks directly).

EXAMPLES

Annotated Code Sample 2

```
@Unsafe({Threat.MEMORY_UNSAFE, Threat.CRASH_PROCESS})
private native void foo(int x);          //Asserts x is positive,
                                         // then derefs it
@MakesSafe(Threat.CRASH_PROCESS)
@Unsafe(Threat.MEMORY_UNSAFE)
```

-continued

```
private void bar(int x) {
    if (x > 0) foo(x);
}
@MakesSafe(Threat.MEMORY_UNSAFE)
public void bar( ) {
    bar(this.knownSafeAddress);
}
```

Inaccessible Classes

Another use of annotations in the embodiments is to keep track of classes that have public unsafe methods, such as sum.misc.Unsafe.

@Inaccessible—Classes with unsafe public methods that are hidden from user classes @PreventsAccess—Methods that expose @Inaccessible class instances, but only to system classes Annotated Code Sample 3

```
package sun.misc;
@Inaccessible
public class Unsafe {
    @PreventsAccess
    public static Unsafe getUnsafe( ) {
        // Caller classloader check: only expose to
        system classes ...
    }
    @Unsafe(Threat.MEMORY_UNSAFE)
    public void putObject(Object object, long fieldOffset,
                                         Object newValue) {
    ... }
}
```

Further Annotation Examples

Annotated Code Sample 4

```
@Safe
private native ClassLoader getClassLoader0( );
// Asserts if declaredFields is null.
@Unsafe(Threat.CRASH_PROCESS)
private native Field[ ] getDeclaredFields0( );
// Checks preconditions before calling unsafe native method.
@MakesSafe(Threat.CRASH_PROCESS)
private Field[ ] getDeclaredFieldsNoCopy( ) {
    if(isPrimitive( ) || isArray( )) return newField[0];
    ReflectionData data = getReflectionData( );
    if (data.declaredFields == null) {
        data.declaredFields = getDeclaredFields0( );
    }
    return data.declaredFields;
}
class ExceptionHelper {
    @Unsafe(Threat,MEMORY_UNSAFE)
    private static native void invokeRuntimeTry
            (long wrapper) throws Throwable;
    /**
    * This is called by the runtime to catch exceptions.
    * The object is placed into a long so that this code
    * may work with 64-bit architectures.
    */
    @Unsafe(Threat.MEMORY_UNSAFE)
    private static Throwable tryCatchInRuntime(long
            exceptionHandlerWrapper) {
        try{
            invokeRuntimeTry(exceptionHandlerWrapper);
```

```
        } catch (Throwable t) {
            // return the exception to the runtime system to
            //let the runtime deal with it and possibly
            // rethrow it.
            return t;
        }
        return null;
    }
    @Safe
    private static native void invokeMain(Class mainClass,
            String ... args);
}
```

In embodiments, auditing verifies that the annotations represent a valid safety perimeter. Verification occurs through the interaction of system method library loading module 140, annotated system method libraries 160, system method dividing module 170, and code safety module 180. It is encompassed by the creation of the code safety perimeter of stage 430. Exemplary embodiments may either provide an interactive exploratory style interface or a batch style tool. Verification results will provide information about the code by grouping it into four groups: (1) safe & audited, (2) safe but needs audit, (3) unsafe and (4) annotations problem.

The "unsafe" code is identified as follows. Annotations declare unsafe code, scoped to class or member. Native methods are assumed to be unsafe. Constructors of unsafe classes are unsafe. All other code is assumed to be safe, and annotations may explicitly declare code to be safe (if it would be assumed to be unsafe).

Verification processes the code in connection with the annotations, as follows. First, no unsafe member may be directly accessible from application code. Second, no unsafe classes may be constructed or derived from application code. Third, methods that reference unsafe code, as above, are inferred to be unsafe as well. Also, the annotation "@MakesSafe" declares that the (audited) code takes steps to ensure that it is safe, despite its use of unsafe references.

A safe perimeter has the following properties. First, unsafe members that are private or package-private are acceptable, since they cannot be referenced externally. Unsafe members of a final class that are protected are OK, since they cannot be subclassed. Unsafe classes with only private or package-private constrictors, with no public static factory methods calling a constructor are OK since they cannot construct instances. Finally, code referencing transitively unsafe members is inferred unsafe and is subject to the above rules, until at the perimeter it is declared safe.

Unconstructable (by user code) classes may have public unsafe methods, since applications cannot create instances in the first place. Thus verification should also confirm that no references to these objects should ever be exposed at the perimeter. Verification Rules Pseudo-Code Inputs:

Targets: A set of packages for analysis, JARs

Source: Metadata for source JARs to compile from (package/type/member, source file, version, author, timestamp)

Audits: Log of audits to date (package/type/member, source file, version, auditor, timestamp)

Step 1: Collect inputs into database based on package/type member

Step 2: Find unsafe endpoints

Step 2A: For each type, find in database (create entry if missing with values "unknown"), for each member; Establish unsafe annotation, mark as @Safe, @Unsafe (with threat attributes), @MakesSafe (with threat attributes); where all native methods, in an embodiment, must have an annotation Step 2B: Collect a set of members with associated threats (i.e. "unsafeness surface area")

Step 3: Transitive closure of reference

Step 3A: Iterate while "unsafe surface area" is non-empty; (1) Clear "new unsafe surface area" set to empty; (2) For each method of each type of each package (2A) For each reference in the method's code to anything in "unsafe surface area", union referent's "unsafeness" into this method's unsafeness set; (3) If "unsafeness" changed, unless this method is annotated @MakesSafe, add this method to the "new unsafe surface area" set; (4) set "unsafe surface area" to "new unsafe surface area" and repeat Step 3B: Identify unsafe classes that may not be constructible (their constructors are unsafe)

Step 3C: For each package, (1) For each class: union the "unsafeness" of public and protected members for the class; (2) If any additional "unsafeness", union it to the class "unsafeness"; (3) For each constructor, (3A) If its "unsafeness" matches that of the class, skip it (3B) Union the constructor's "unsafeness" with the classes (3C) Add each constructor to "new unsafe surface area"

Step 3D: iterate (as above) if the "new unsafe surface area" is non-empty, else next step Step 4: Verify Step 4A: Information collected: (1) For each package, trust level ("System" or "Application"); (2) For each type, (2A) For each member (of a type, of a package) (2B) Transitive closure of "unsafeness" (2C) Annotations "@Unsafe" or "@MakesSafe" (2D) Source file, source versions, author, source code timestamp (2E) Latest auditor, audit timestamp, audited source file, audited version Step 4B Verification tests are as follows: (1) Native method, in an embodiment, must have an annotation, producing WARNING: Missing annotation on system method; (2) Native method may be in a "System" trust package producing WARNING: Native method may be in system package Step 4C: Members with "unsafeness" require validation as follows: (1) If annotated "@MakesSafe": (1A) Annotation, in an embodiment, must specify all unsafe attributes in "unsafeness" set, producing ERROR: Must also @MakesSafe for . . . attribute(s); (1B) annotation, in an embodiment, must specify only unsafe attributes in "unsafeness" set, producing WARNING: No need to make safe for . . . attribute(s)

Step 4D: If annotated "@Safe" or "@MakesSafe" it may be audited (up to data): (1A) Require audit timestamp>source code timestamp (1B) require audit version>=source version, else producing ERROR: Audit is out of date (version/version, time/time)

Step 4E: Unsafe methods, in an embodiment, must not have the access specifiers: public or (protected and non-final class), else producing ERROR: Unsafe method is publicly accessible . . . attribute(s)

Step 4F: Unsafe methods, in an embodiment, must not have package-private access unless in a "System" trust package, else producing ERROR: Unsafe method not in system package . . . attribute(s)

NOTE: (1) WARNING is for annotation usage problems, ERROR is for potential unaudited code flaws, (2) The above may produce redundant error messages, which should be filtered before being presented to the user.

CONCLUSION

The embodiments as set forth provide the advantage of security analysis that may be done offline to process the safety characteristics of code in a language such as the JAVA language without affecting runtime performance. It offers the advantages that by annotating system libraries with safety properties, an automated auditing tool may establish both which methods will always be safe as well as determining which restrictions on parameters may make methods perform safely. It also places careful restrictions on capabilities such as reflection and custom classloaders that allow these advanced capabilities to be used without causing safety problems. Thus, the rules provide for safe execution of code once it has been audited while minimizing restrictions on coding, in a flexible and effective manner.

The Summary and Abstract sections may set forth one or more but not all exemplary embodiments of the present invention as contemplated by the inventor(s), and thus are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teachings and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for ensuring that user code executes safely, comprising:
    loading, using a processor, user code and system method code defining a set of system methods in one or more system method libraries that are called by the user code, wherein the system method code has embedded annotations that provide information about safety properties of respective system methods with which the annotations are associated;
    dividing the set of system methods into safe system methods and unsafe system methods based on the annotations, wherein a safe method is a method that cannot violate safety properties regardless of the values of its parameters, and wherein an unsafe method is a method for which one or more parameter values exist that cause the method to violate safety properties, wherein the annotations associated with one or more unsafe system methods specify safety threats that the respective system methods can cause;
    executing the loaded user code when an offline audit of the system method code verifies that the annotations provide a valid code safety perimeter for the loaded user code, wherein a code safety perimeter establishes which system methods are visible to user code, a code safety perimeter is valid when only safe system methods are visible to user code, and unsafe system methods must be called via a safe system method rather than being directly visible to user code, wherein the set of system methods includes one or more safe system methods that are managed methods for one or more unsafe system methods, wherein the managed methods call the unsafe system methods while enforcing parameter restrictions specified by the annotations, and wherein the offline audit verifies as valid a code safety perimeter in which the managed methods are visible to user code and allow access to the unsafe system methods, but the unsafe system methods themselves are not visible to the user code; and
    preventing execution of the loaded user code when the offline audit of the system method code verifies that the annotations do not provide a valid code safety perimeter for the loaded user code.

2. The computer-implemented method of claim 1, further comprising:
    digitally signing the user code as safe when the offline audit of the system method code verifies that the annotations provide a valid code safety perimeter for the loaded user code; and
    digitally signing the user code as unsafe when the offline audit of the system method code verifies that the annotations do not provide a valid code safety perimeter for the loaded user code.

3. The computer-implemented method of claim 1, wherein the annotations specify that the system methods with which the annotations are associated are safe or unsafe, and the dividing comprises:
    grouping system methods that are associated with annotations that specify that those system methods are safe into the safe system methods; and
    grouping system methods that are associated with annotations that specify that those system methods are unsafe into the unsafe system methods.

4. The computer-implemented method of claim 1, wherein the annotations associated with one or more unsafe system methods specify parameter restrictions, wherein if the unsafe system method is called with parameters that satisfy the parameter restrictions, then the unsafe system method cannot violate safety properties.

5. The computer-implemented method of claim 1, wherein at least one system method is associated with an annotation that the system method is inaccessible and the annotations only provide a valid code safety perimeter when any inaccessible system method is only visible to other system methods.

6. The computer-implemented method of claim 1, further comprising:
    storing the annotated system method libraries in a database, and providing access to the database to facilitate performing the offline audit.

7. The computer-implemented method of claim 1, further comprising:
    providing information about potential safety property violations in system method libraries using an automated tool, when the offline audit is unable to verify that the annotations provide a valid code safety perimeter.

8. The computer-implemented method of claim 7, further comprising:

providing information about which annotations must be added to the system method libraries to provide a valid code safety perimeter.

9. The computer-implemented method of claim 1, wherein the offline audit verifies that the annotations provide a valid code safety perimeter only when the user code only uses custom class loaders that do not load classes into system packages.

10. The computer-implemented method of claim 1, wherein the offline audit verifies that the annotations provide a valid code safety perimeter only when the user code only uses reflection in a manner that does not bypass access restrictions on system classes.

11. A system for ensuring that user code executes safely, comprising:
a processor; and
a system method library loading module, configured to use the processor to:
load user code and system method code defining a set of system methods in one or more system method libraries that are called by the user code, wherein the system method code has embedded annotations that provide information about safety properties of respective system methods with which the annotations are associated;
a system method dividing module, configured to use the processor to:
divide the set of system methods into safe system methods and unsafe system methods based on the annotations, wherein a safe method is a method that cannot violate safety properties regardless of the values of its parameters, and wherein an unsafe method is a method for which one or more parameter values exist that cause the method to violate safety properties, wherein the annotations associated with one or more unsafe system methods specify safety threats that the respective system methods can cause; and
a code safety module, configured to use the processor to:
execute the loaded user code when an offline audit of the system method code verifies that the annotations provide a valid code safety perimeter for the loaded user code, wherein a code safety perimeter establishes which system methods are visible to user code, a code safety perimeter is valid when only safe system methods are visible to user code, and unsafe system methods must be called via a safe system method rather than being directly visible to user code, wherein the set of system methods includes one or more safe system methods that are managed methods for one or more unsafe system methods, wherein the managed methods call the unsafe system methods while enforcing parameter restrictions, and wherein the offline audit verifies as valid a code safety perimeter in which the managed methods are visible to user code and allow access to the unsafe system methods, but the unsafe system methods themselves are not visible to the user code; and
prevent execution of the loaded user code when the offline audit of the system method code verifies that the annotations do not provide a valid code safety perimeter for the loaded user code.

12. The system of claim 11, wherein the code safety module is further configured to use the processor to:
digitally signing the user code as safe when the offline audit of the system method code verifies that the annotations provide a valid code safety perimeter for the loaded user code; and
digitally signing the user code as unsafe when the offline audit of the system method code verifies that the annotations do not provide a valid code safety perimeter for the loaded user code.

13. The system of claim 11, wherein the annotations specify that the system methods with which the annotations are associated are safe or unsafe, and the system method dividing module is configured to:
group system methods that are associated with annotations that specify that those system methods are safe into the safe system methods; and
group system methods that are associated with annotations that specify that those system methods are unsafe into the unsafe system methods.

14. The system of claim 11, wherein the annotations associated with one or more unsafe system methods specify parameter restrictions, wherein if the unsafe system method is called with parameters that satisfy the parameter restrictions, then the unsafe system method cannot violate safety properties.

15. The system of claim 11, wherein at least one system method is associated with an annotation that the system method is inaccessible and the annotations only provide a valid code safety perimeter when any inaccessible system method is only visible to other system methods.

16. The system of claim 11, further comprising:
a safety database, configured to store the annotated system method libraries in a database, wherein the code safety module is further configured to provide access to the database to facilitate performing the offline audit.

17. The system of claim 11, wherein the code safety module is further configured to provide information about potential safety property violations in system method libraries when the offline audit is unable to verify that the annotations provide a valid code safety perimeter.

18. The system of claim 16, further comprising:
wherein the code safety module is further configured to provide information about which annotations must be added to the system method libraries to provide a valid code safety perimeter.

19. The system of claim 11, wherein the offline audit verifies that the annotations provide a valid code safety perimeter only when the user code only uses custom class loaders that do not load classes into system packages.

20. The system of claim 11, wherein the offline audit verifies that the annotations provide a valid code safety perimeter only when the user code only uses reflection in a manner that does not bypass access restrictions on system classes.

21. A non-transitory computer-readable medium having computer-executable instructions stored thereon that, when executed by a processor, cause the processor to ensure that user code executes safely by:
loading, using a processor, user code and system method code defining a set of system methods in one or more system method libraries that are called by the user code, wherein the system method code has embedded annotations that provide information about safety properties of respective system methods with which the annotations are associated;
dividing the set of system methods into safe system methods and unsafe system methods based on the annotations, wherein a safe method is a method that cannot violate safety properties regardless of the values of its parameters, and wherein an unsafe method is a method for which one or more parameter values exist that cause the method to violate safety properties, wherein the annotations associated with one or more unsafe system methods specify safety threats that the respective system methods can cause; and executing the loaded user code when an offline audit of the system method code verifies that the annotations provide a valid code safety perimeter for the loaded user code, wherein a code safety perimeter establishes which system methods are visible to user code, a code safety perimeter is valid when only safe system methods are visible to user code, and unsafe system methods must be called via a safe system method rather than being directly visible to user code, wherein the set of system methods includes one or more safe system methods that are managed methods for one or more unsafe system methods, wherein the managed methods call the unsafe system methods while enforcing parameter restrictions, and wherein the offline audit verifies as valid a code safety perimeter in which the managed methods are visible to user code and allow access to the unsafe system methods, but the unsafe system methods themselves are not visible to the user code; and preventing execution of the loaded user code when the offline audit of the system method code verifies that the annotations do not provide a valid code safety perimeter for the loaded user code.

\* \* \* \* \*